(12) United States Patent
Zhao et al.

(10) Patent No.: US 11,359,905 B2
(45) Date of Patent: Jun. 14, 2022

(54) COMPLEX SURFACE THREE-COORDINATE MEASURING DEVICE AND ERROR COMPENSATION METHOD

(71) Applicant: Huazhong University of Science and Technology, Hubei (CN)

(72) Inventors: Huan Zhao, Hubei (CN); Hao Li, Hubei (CN); Han Ding, Hubei (CN); Sijie Yan, Hubei (CN); Xiaoming Zhang, Hubei (CN); Xiaojian Zhang, Hubei (CN)

(73) Assignee: Huazhong University of Science and Technology, Hubei (CN)

( * ) Notice: Subject to any disclaimer, the term of this patent is extended or adjusted under 35 U.S.C. 154(b) by 960 days.

(21) Appl. No.: 16/116,468

(22) Filed: Aug. 29, 2018

(65) Prior Publication Data
US 2019/0294267 A1    Sep. 26, 2019

(30) Foreign Application Priority Data
Mar. 26, 2018    (CN) .......................... 201810252394.8

(51) Int. Cl.
| | |
|---|---|
| *G01B 5/012* | (2006.01) |
| *G01B 3/00* | (2006.01) |
| *G01B 5/008* | (2006.01) |
| *G01L 5/22* | (2006.01) |
| *G06F 3/0354* | (2013.01) |
| *G01B 21/20* | (2006.01) |
| *G01B 5/20* | (2006.01) |
| *G01L 5/16* | (2020.01) |

(52) U.S. Cl.
CPC ............. *G01B 5/012* (2013.01); *G01B 3/008* (2013.01); *G01B 5/008* (2013.01); *G01B 5/20* (2013.01); *G01B 21/20* (2013.01); *G01L 5/16* (2013.01); *G01L 5/22* (2013.01); *G06F 3/03545* (2013.01)

(58) Field of Classification Search
CPC ....................................................... G01B 5/016
USPC ............................................................. 33/559
See application file for complete search history.

(56) References Cited

U.S. PATENT DOCUMENTS

| | | | | |
|---|---|---|---|---|
| 5,040,306 | A * | 8/1991 | McMurtry ............. | G01B 5/012 33/561 |
| 5,321,895 | A * | 6/1994 | Dubois-Dunilac .... | G01B 5/012 33/559 |
| 5,806,201 | A * | 9/1998 | Feichtinger ............ | G01B 5/012 33/561 |

(Continued)

*Primary Examiner* — George B Bennett
(74) *Attorney, Agent, or Firm* — Hamre, Schumann, Mueller & Larson, P.C.

(57) ABSTRACT

A complex surface three-coordinate measuring device includes a three-degree-of-freedom motion platform and a force control probe, the force control probe is fixedly mounted on the Z-axis sliding block, which is in the same direction as the X-axis direction and used to contact with the workpiece surface with constant force. A six-axis force sensor is used to collect the contact force between the stylus and the workpiece surface. In this method, the force control is realized in the measurement to make the stylus in constant force contact with the workpiece surface. The error compensation direction is determined according to the direction of the contact force, and then the effective radius of the stylus spherical head is compensated in this direction, thus the actual contact point of stylus and workpiece can be obtained.

8 Claims, 3 Drawing Sheets

(56) References Cited

U.S. PATENT DOCUMENTS

| | | | | |
|---|---|---|---|---|
| 7,568,373 B2* | 8/2009 | McMurtry | ............ | G01B 21/042 73/1.81 |
| 8,006,402 B2* | 8/2011 | Yoshizumi | ............ | G01B 21/045 33/559 |
| 8,191,408 B2* | 6/2012 | Igasaki | ................. | G01B 3/008 33/503 |
| 10,794,684 B2* | 10/2020 | Raho | ................. | G01B 9/02007 |
| 10,914,570 B2* | 2/2021 | Hamner | ................. | G01B 5/016 |
| 2020/0191564 A1* | 6/2020 | Buckingham | .......... | G01B 5/012 |

* cited by examiner

COMPLEX SURFACE THREE-COORDINATE MEASURING DEVICE AND ERROR COMPENSATION METHOD

TECHNICAL FIELD

The present invention belongs to the field of three-dimensional measurement, and more particularly relates to a complex surface three-coordinate measuring device and an error compensation method.

BACKGROUND ART

Three-coordinate measuring machines (CMMs) are widely used in product quality inspection and reverse engineering, and have the characteristics of strong versatility, high measurement accuracy, large measuring range and the like. At present, the commercial CMM technology is relatively mature, and the measurement accuracy can meet the requirements of common commercial and research purposes. However, with the continuous development of industrial technology, the accuracy requirements of workpieces are getting higher and higher, and the existing three-coordinate measurement accuracy can no longer meet the detection requirements of some high-precision parts. Typical parts with complex surfaces such as aero-engine blades, steam turbine blades and gas turbine blades not only require high processing and inspection accuracy, but also have large change in the curvature of the workpiece profile. In addition, large parts with complex surfaces such as automobile bodies, high-speed rail bodies and wind turbine blades have a large measurement area and large change in surface curvature. Therefore, it is difficult for the conventional CMMs to accurately measure these parts.

The measurement accuracy of the CMMs can be analyzed from the following two aspects. On the one hand, kinematic accuracy of motion system is the most important factor determining the precision of CMM. Kinematic accuracy depends on the precision of the guideway and the driving motor, which have been achieved by well-known manufacturers such as Renishaw, Hexagon, Aerotech and HTK. On the other hand, it is important to improve the accuracy of error compensation for the stylus spherical head radius. Recently, researchers have done a lot of research on the error compensation for the measurement point, which can be divided into two categories: error compensation of the measurement point estimated based on the CAD model information of the workpiece, and error compensation of the measurement point obtained based on the measured geometric relationship of the center coordinate of the stylus spherical head. Since the parts with complex surfaces have large change in surface curvature, the contact direction of the stylus with the workpiece surface is changed with the undulation of the surface, and the actual contact direction of the stylus with the workpiece surface cannot be accurately estimated by using the above two methods. Thus, the approximate location of the actual contact point cannot be accurately calculated.

SUMMARY OF THE PRESENT INVENTION

In view of the above-described problems, the present invention provides a complex surface three-coordinate measuring device and an error compensation method, in which a force control probe that cooperates with a three-degree-of-freedom motion platform is designed to achieve three-dimensional measurement of a complex surface, and an error compensation method for the radius of the stylus spherical head is provided. In this method, the direction of error compensation, which is obtained by calculating the direction of the contact force at the actual contact point, is used to estimate the coordinate of actual contact point during the measurement. The method effectively improves the contour measurement accuracy of the complex surface, and has the advantages of convenient measurement, high measurement accuracy and the like.

In order to achieve the above objective, according to an aspect of the present invention, there is provided a force control probe for three-coordinate measurement of a complex surface.

The force control probe includes a flange, a six-axis force sensor and a micro grating ruler, in which the flange is mounted on a three-degree-of-freedom (3DOF) motion platform, one end of the six-axis force sensor is mounted on the flange 1, the other end of the six-axis force sensor is connected to a bracket on which the micro grating ruler is mounted, the micro grating ruler includes a grating and a reading head, the grating is fixed on the bracket, the reading head is mounted on the grating and is slidable within the grating, a spring is disposed between the reading head and the grating, a stylus having a spherical head is provided on the reading head, and the spherical head of the stylus is kept in constant force contact with a surface of a workpiece to be measured during measurement.

Preferably, the spherical head of the stylus is kept in constant force contact with the surface of the workpiece to be measured during measurement in the following manner: an actual contact force is calculated according to a measurement result of the six-axis force sensor, the actual contact force is compared with a target contact force, when the actual contact force is greater than the target contact force, the force control probe is moved backward to enable the stylus to be away from the workpiece to be measured, and when the actual contact force is less than the target contact force, the force control probe is moved forward to enable the stylus to get close to the workpiece to be measured, so that the actual contact force is consistent with the target contact force and the spherical head of the stylus is kept in constant force contact with the surface of the workpiece to be measured.

According to an aspect of the present invention, there is provided a complex surface three-coordinate measuring device, which comprises a three-degree-of-freedom motion platform and the force control probe, in which the three-degree-of-freedom motion platform is used to move the force control probe in three-dimensional space relative to the workpiece surface and includes a workbench as well as an X-axis motion module, a Y-axis motion module and a Z-axis motion module which are disposed on the workbench and mutually orthogonal; the X-axis motion module comprises an X-axis linear module, an X-axis servo motor, X-axis guide rails and an X-axis sliding block disposed on the X-axis linear module, in which the X-axis servo motor is configured to drive the X-axis sliding block to move in the X-axis direction, and the X-axis guide rails are respectively disposed on two sides of the X-axis sliding block to guide the movement; the Y-axis motion module comprises a Y-axis linear module, a Y-axis servo motor, Y-axis guide rails and a Y-axis sliding block disposed on the Y-axis linear module, in which the Y-axis servo motor is configured to drive the Y-axis sliding block to move in the Y-axis direction, and the Y-axis guide rails are respectively disposed on two sides of the Y-axis sliding block to guide the movement; the Z-axis motion module comprises a stand column, a Z-axis linear module, a Z-axis servo motor and a Z-axis sliding block disposed on the Z-axis linear module, in which the stand column is fixedly mounted on the workbench, the Z-axis linear module is mounted on the stand column, the Z-axis servo motor is configured to drive the Z-axis sliding block to move in the Z-axis direction, and the force control probe is fixedly mounted on the Z-axis sliding block and is in the same direction as the X-axis direction; and the X-axis linear module, the Y-axis linear module and the Z-axis linear module are respectively provided with a grating ruler, and the grating rulers are configured to respectively measure X-axis, Y-axis and Z-axis displacements when the force control probe is in constant force contact with the surface of the workpiece to be measured.

According to an aspect of the present invention, there is provided an error compensation method based on force feedback information for the complex surface three-coordinate measuring device, comprising:

S1: determining a transformation matrix $K_p$ of a work coordinate system $O_w$ to a workpiece coordinate system $O_c$ and obtaining an initial value $P_0$ ($x_0$, $y_0$, $z_0$) of the center of the spherical head of the stylus in the work coordinate system;

S2: controlling the three-degree-of-freedom motion platform such that the spherical head of the stylus of the force control probe is in contact with the surface of the workpiece to be measured, adjusting the movement of the X-axis sliding block to keep the spherical head of the stylus in constant force contact with the surface of the workpiece and then respectively reading X-axis, Y-axis and Z-axis displacements $x_s$, $y_s$, $z_s$ through respective grating rulers;

S3: calculating a real-time coordinate $P_t$ of the center of the spherical head of the stylus:

$$P_t(x_t, y_t, z_t) = P_0(x_0, y_0, z_0) + (x_s - \delta_s, z_s),$$

where $\delta_s$ represents a displacement of the stylus relative to the grating of the force control probe in the X-axis direction;

S4: calculating a coordinate of an actual contact point $P_w$ between the stylus and the workpiece surface in the work coordinate system:

$$P_w(x_w, y_w, z_w) = P_t(x_t, y_t, z_t) \pm (x_b, y_b, z_b),$$

where $x_b$, $y_b$, $z_b$ represent three components of an error compensation vector $\overset{1}{R}$;

S5: performing coordinate transformation of the actual contact point $P_w$ to obtain a coordinate value of the actual contact point $P_w$ in the workpiece coordinate system:

$$[x_c, y_c, z_c]^T = K_p[x_w, y_w, z_w]^T.$$

Preferably, the three components ($x_b$, $y_b$, $z_b$) of the error compensation vector $\overset{1}{R}$ are calculated by the following formulas:

$$\begin{cases} m_x = f'_z \cdot y_b - f'_y \cdot (L + z_b) \\ m_y = f'_x \cdot (L + z_b) + f'_z \cdot x_b \\ m_z = -f'_x \cdot y_b - f'_y \cdot x_b \\ f_x = f'_x \\ f_y = f'_y \\ f_z = f'_z \end{cases},$$

where L represents a distance from the force center $S_0$ of the six-axis force sensor to the center $Q_0$ of the spherical head of stylus, $f_x$, $f_y$, $f_z$, $m_x$, $m_y$, $m_z$ represent six force signals obtained by the six-axis force sensor when the stylus is in contact with the workpiece surface, and $f'_x$, $f'_y$, $f'_z$ represent component forces of the contact force $F_q$ received at the actual contact point $P_w$, respectively.

Preferably, the position transformation matrix $K_p$ of the work coordinate system $O_w$ to the workpiece coordinate system $O_c$ is determined by the following formulas:

$$K_p = \begin{bmatrix} R & T \\ 0 & 1 \end{bmatrix}$$

where R represents a rotation matrix from the work coordinate system to the workpiece coordinate system, and T represents a translation matrix from the work coordinate system to the workpiece coordinate system.

Preferably, the translation matrix T from the work coordinate system to the workpiece coordinate system is represented as $T = [\Delta x, \Delta y, \Delta z]^T$, where $\Delta x$, $\Delta y$, $\Delta z$ respectively represent X-axis, Y-axis and Z-axis displacements of the center of the spherical head of the stylus in the work coordinate system to the origin in the workpiece coordinate system.

Preferably, the rotation matrix R from the work coordinate system to the workpiece coordinate system is determined by the following formulas:

$$R = \begin{bmatrix} \cos\varphi\cos\vartheta & \cos\varphi\sin\vartheta\sin\psi - \sin\varphi\cos\psi & \cos\varphi\sin\vartheta\cos\psi + \sin\varphi\sin\psi \\ \sin\varphi\cos\vartheta & \sin\varphi\sin\vartheta\sin\psi + \cos\varphi\cos\psi & \sin\varphi\sin\vartheta\cos\psi - \cos\varphi\sin\psi \\ -\sin\vartheta & \cos\vartheta\sin\psi & \cos\vartheta\cos\psi \end{bmatrix}$$

where $\psi$, $\partial$, $\varphi$ respectively represent rotation angles of the respective XYZ axes of the workpiece coordinate system relative to the respective XYZ axes of the work coordinate system.

In general, compared with the prior art, the present invention has the following beneficial effects:

1. in the present invention, a three-coordinate measuring device in which a three-degree-of-freedom motion platform cooperates with a force control probe is designed, and through studying and designing the specific structure and arrangement of the force control probe to add a force control part in the three-coordinate measurement, the stylus is always kept in constant force contact with the workpiece surface during measurement, and the measured data can truly reflect the contour information of the workpiece surface;

2. in the present invention, a six-axle force sensor is used to collect the contact force received by the stylus, and the error compensation direction of the radius of the stylus spherical head is estimated by the force direction, improving the measurement accuracy;

3. in the present invention, a spring and a micro grating ruler are disposed in the force control probe, which can effectively reduce the vibration generated when the rigid body is in direct contact with other rigid body and can effectively measure the small displacement of the stylus which is in contact with the workpiece surface, so as to further ensure the measurement accuracy;

4. in the present invention, a column-type three-axis motion platform is used, which provides a spacious space for workpiece mounting and disassembly; and two guide rails are arranged in the XY directions, respectively, which improves the movement accuracy of the platform; and 5. in the present invention, an error compensation method based on force information is further provided, in which based on the data measured by the six-axle force sensor and the micro grating ruler, the three-dimensional measurement of the complex surface is realized, and the real-time compensation of the measurement data is realized during the measurement, thereby improving the measurement accuracy.

BRIEF DESCRIPTION OF THE DRAWINGS

In all figures, the same elements or structures are denoted by the same reference numerals, in which.

1: flange, 2: six-axis force sensor, 3: bracket, 4: data interface, 5: grating, 6: fastening nut, 7: spring, 8: reading head, 9: stylus, 10: workbench, 11: limit switch, 12: X-axis linear module, 13: X-axis servo motor, 14: X-axis guide rail, 15: Y-axis guide rail, 16: grating ruler, 17: X-axis sliding block, 18: Y-axis servo motor, 19: Y-axis linear module, 20: Y-axis sliding block, 21: stand column, 22: Z-axis sliding block, 23: Z-axis linear module, and 24: Z-axis servo motor.

DETAILED DESCRIPTION OF THE EMBODIMENTS

For clear understanding of the objectives, features and advantages of the present invention, detailed description of the present invention will be given below in conjunction with accompanying drawings and specific embodiments. It should be noted that the embodiments described herein are only meant to explain the present invention, and not to limit the scope of the present invention.

Figure 1:
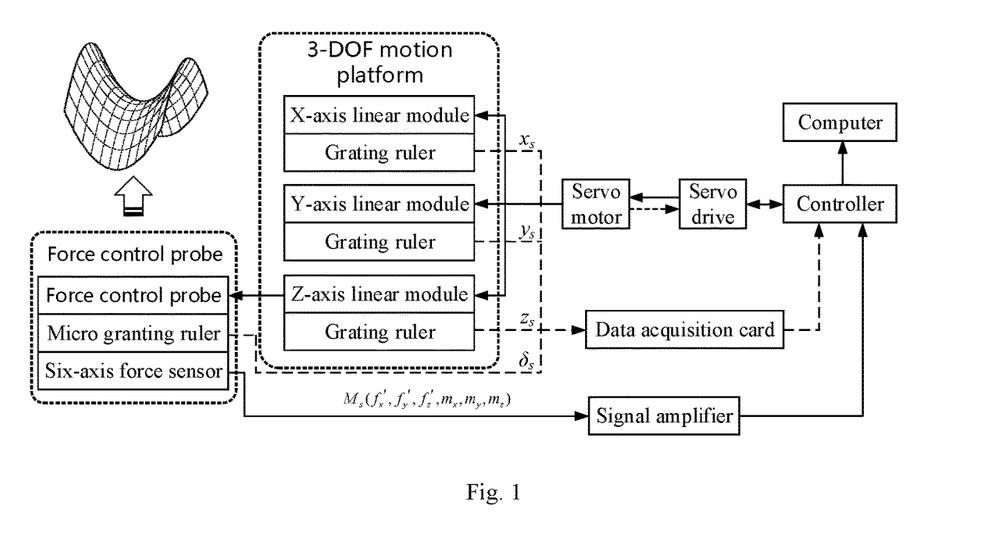
FIG. 1 is a control schematic diagram of a complex surface three-coordinate measuring device according to a preferred embodiment of the present invention.
Figure 2:
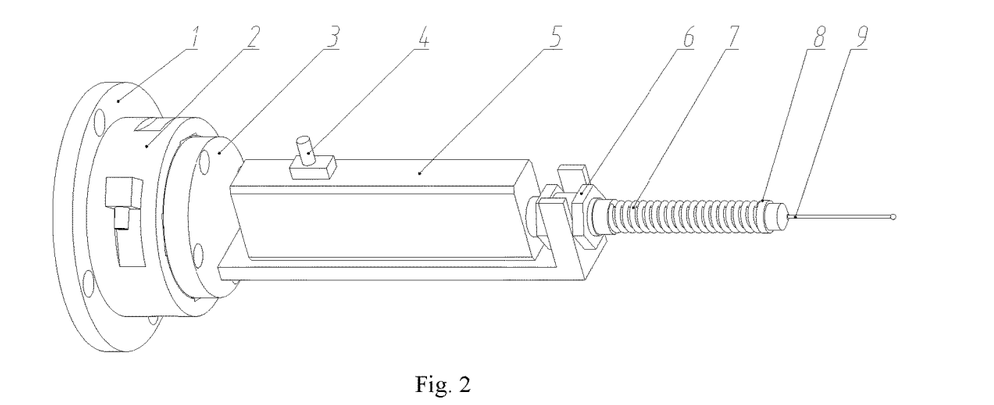
FIG. 2 is a structural schematic diagram of a force control probe according to the preferred embodiment of the present invention.

As shown in FIG. 1, a force control probe for three-coordinate measurement of a complex surface is provided in an embodiment of the present invention, in which the force control probe is in the same direction as the X axis of the three-degree-of-freedom motion platform, and is used for keeping the stylus in constant force contact with the workpiece surface and feeding back the contact force between the stylus and the workpiece surface through a six-axis force sensor. As shown in FIG. 2, the force control probe includes a flange 1, a six-axis force sensor 2 and a micro grating ruler. The flange 1 is mounted on the three-degree-of-freedom motion platform, one end of the six-axis force sensor 2 is mounted on the flange 1, and the other end of the six-axis force sensor 2 is connected to a bracket 3 on which the micro grating ruler is mounted. The micro grating ruler includes a grating 5 and a reading head 8. The grating 5 is fixed on the bracket 3 by a fastening nut 6, and the reading head 8 is inserted inside the grating 5 (inserted inside the right end of the grating 5 as shown in FIG. 2) and is slidable within the grating 5. A spring 7 is disposed between the reading head 8 and the grating 5. Further, a stylus 9 having a spherical head is provided at the right end of the reading head 8.

Figure 4:
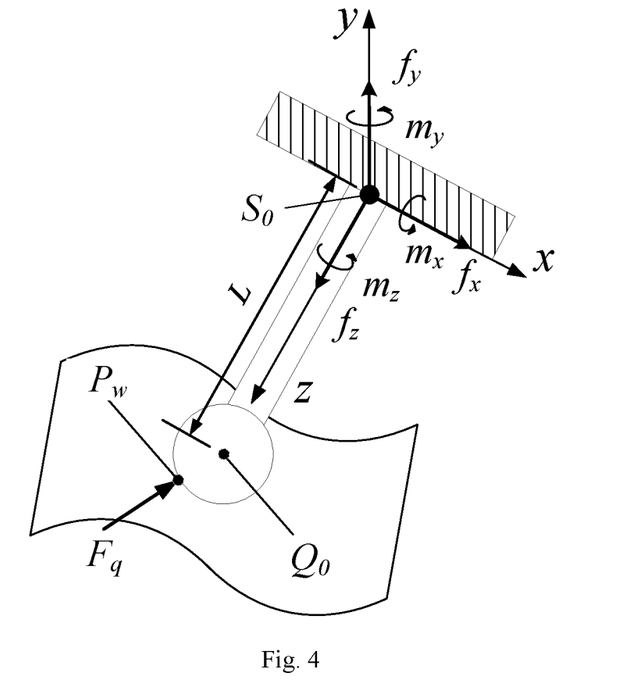
FIG. 4 is a schematic diagram showing error compensation of the radius of the stylus spherical head according to the preferred embodiment of the present invention.
Figure 5:
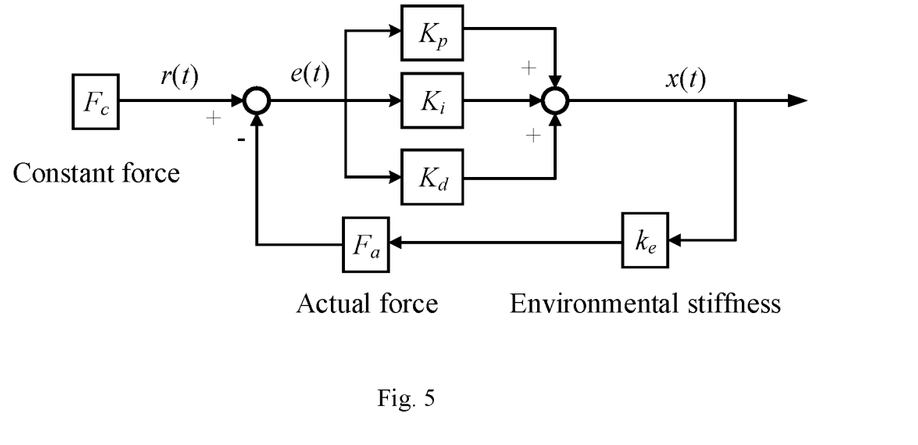
FIG. 5 is a schematic diagram showing the force control according to the present invention.

When a complex surface such as a blade is measured, the six-axis force sensor 2 collects the contact force between the stylus 9 and the workpiece and feeds back the force signal to the controller. With a PID control algorithm, the controller enables the actual contact force $F_a$ to follow the given constant force value $F_c$ (i.e., the target contact force), and the control principle is shown in FIGS. 4 and 5. The actual contact force is calculated according to the measurement result of the six-axis force sensor, and then the actual contact force is compared with the target contact force. When the actual contact force is greater than the target contact force, the force control probe is moved backward to enable the stylus to be away from the workpiece to be measured, that is, the control amount is negative and the X-axis servo motor moves backward; when the actual contact force is less than the target contact force, the force control probe is moved forward to enable the stylus to get close to the workpiece to be measured, that is, the control amount is positive and the X-axis servo motor moves forward. Through PID adjustment, the actual contact force is consistent with the target contact force so that the spherical head of the stylus is kept in constant force contact with the workpiece to be measured, and the target contact force can be limited according to actual needs.

In order to avoid large vibration generated when the stylus is in rigid contact with the workpiece surface, a spring 7 is provided to buffer the vibration so as to improve the measurement accuracy. With the spring, when the stylus is in rigid contact with the workpiece, the stylus can retract. At this time, the reading head 8 can move relative to the grating 5, and the spring 7 is compressed. Further, the movement amount (i.e., displacement) of the reading head relative to the grating can be transmitted to the controller via the data interface 4 on the grating 5.

Figure 3:
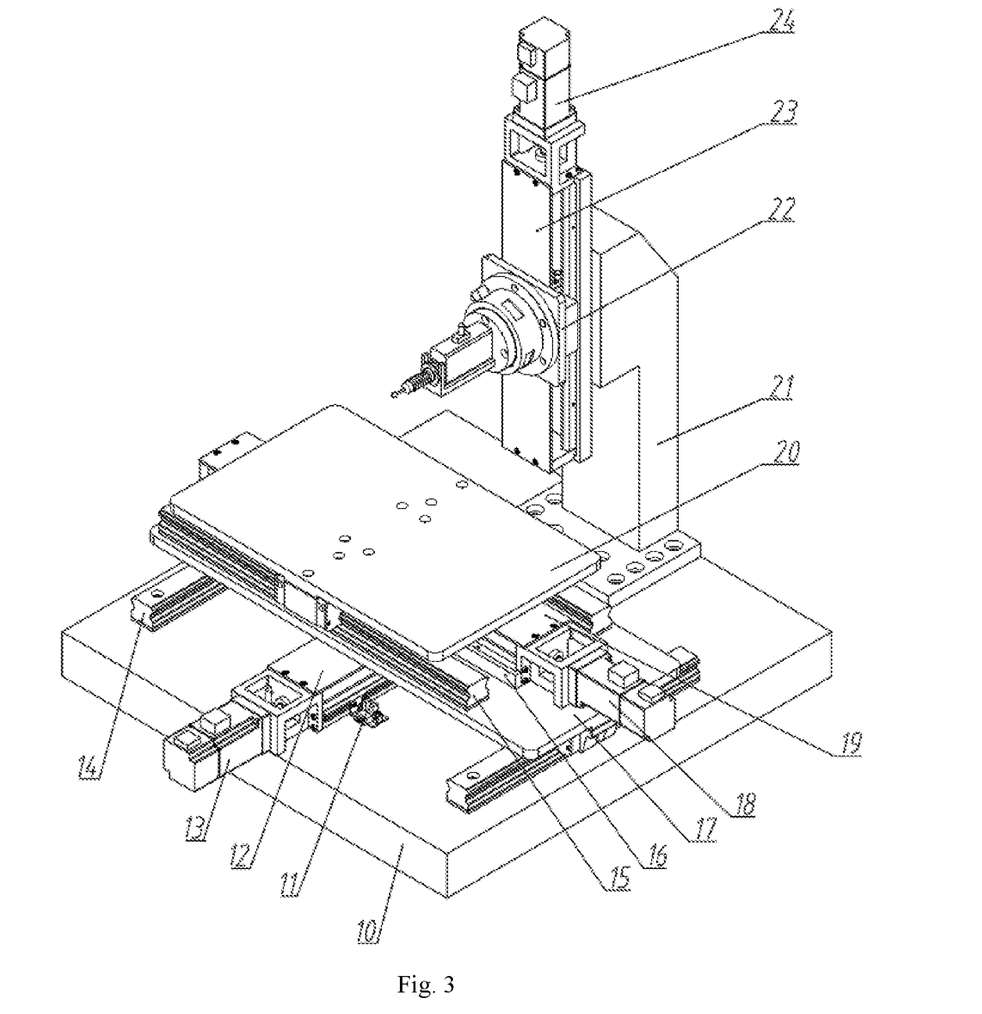
FIG. 3 is a structural schematic diagram of a three-degree-of-freedom motion platform according to the preferred embodiment of the present invention.

Further, as shown in FIG. 3, a complex surface three-coordinate measuring device provided in the present invention includes a three-degree-of-freedom motion platform and the force control probe. The three-degree-of-freedom motion platform is configured to move the force control probe in the three-dimensional space relative to the workpiece surface, and includes a workbench 10 as well as an X-axis motion module, a Y-axis motion module and a Z-axis motion module which are disposed on the workbench 10 and mutually orthogonal. The X-axis motion module comprises an X-axis linear module 12, an X-axis servo motor 13, X-axis guide rails 14 and an X-axis sliding block 17 disposed on the X-axis linear module 12, in which the X-axis servo motor 13 is configured to drive the X-axis sliding block 17 to move in the X-axis direction, and the X-axis guide rails 14 are respectively disposed on two sides of the X-axis sliding block 17 to guide the movement. The Y-axis motion module comprises a Y-axis linear module 19, a Y-axis servo motor 18, Y-axis guide rails 15 and a Y-axis sliding block 20 disposed on the Y-axis linear module 19, in which the Y-axis servo motor 18 is configured to drive the Y-axis sliding block 20 to move in the Y-axis direction, and the Y-axis guide rails 15 are respectively disposed on two sides of the Y-axis sliding block 20 to guide the movement. The Z-axis motion module comprises a stand column 21, a Z-axis linear module 23, a Z-axis servo motor 24 and a Z-axis sliding block 22 disposed on the Z-axis linear module 23, in which the stand column 21 is fixedly mounted on the workbench 10, the Z-axis linear module 23 is mounted on the stand column 21, the Z-axis servo motor 24 is configured to drive the Z-axis sliding block 22 to move in the Z-axis direction, and the force control probe is fixedly mounted on the Z-axis sliding block 22 and is in the same direction as the X-axis direction. The X-axis linear module, the Y-axis linear module and the Z-axis linear module are respectively provided with a grating ruler 16, and the grating rulers 16 are configured to respectively measure X-axis, Y-axis and Z-axis displacements when the force control probe is in constant force contact with the workpiece to be measured.

The present invention also provides an error compensation method for the complex surface three-coordinate measuring device, and the error compensation method is performed based on force feedback information and includes the following steps:

S1: firstly, establishing a coordinate system in which the three-coordinate measuring device is located (i.e., the work coordinate system $O_w$) and a coordinate system in which the workpiece to be measured is located (i.e., the workpiece coordinate system $O_c$) (specifically, the XYZ directions of the three-degree-of-freedom motion platform in the three-coordinate measuring device can be determined according to actual needs, then a point in the three-coordinate measuring system is taken as the origin of the work coordinate system according to actual needs, and the XYZ axes of the work coordinate system are determined by the XYZ directions of the three-degree-of-freedom motion platform, so that the work coordinate system is established. The method for establishing the work coordinate system belongs to the prior art, and the work coordinate system can be established by any existing coordinate system establishment method. After the work coordinate system is established, the workpiece coordinate system $O_c$ is established. For example, a point on the workpiece is taken as the origin of the workpiece coordinate system $O_c$, and then three directions are selected as the XYZ axes of the workpiece coordinate system as needed. The method for establishing the workpiece coordinate system also belongs to the prior art.); and secondly, according to the work coordinate system $O_w$ and the workpiece coordinate system $O_c$, determining a position transformation matrix $K_p$ of the work coordinate system $O_w$ to the workpiece coordinate system $O_w$ and obtaining an initial value $P_0$ ($x_0$, $y_0$, $z_0$) of the center of the spherical head of the stylus in the work coordinate system $O_w$ (specifically, since the positions of the components in the three-coordinate measuring device are fixed, when the work coordinate system $O_w$ is established, the initial value $P_0(x_0, y_0, z_0)$ (i.e., the coordinate value) of the center of the spherical head of the stylus in the work coordinate system $O_w$ can be obtained according to the relative position of the center of the spherical head of the stylus and the origin of the work coordinate system).

In the step S1, the position transformation matrix $K_p$ of the work coordinate system $O_w$ to the workpiece coordinate system $O_c$ is specifically obtained in the following manner:

firstly, moving the center of the spherical head of the stylus in the work coordinate system to the origin of the workpiece coordinate system, and recording displacements $\Delta x$, $\Delta y$, $\Delta z$ in the respective directions to obtain a translation matrix $T=[\Delta x, \Delta y, \Delta z]^T$ of the workpiece coordinate system relative to the work coordinate system; and secondly, calculating rotation angles $\psi$, $\vartheta$, $\varphi$ of the respective XYZ axes of the workpiece coordinate system relative to the respective XYZ axes of the work coordinate system, and determining a rotation matrix R from the work coordinate system to the workpiece coordinate system, where $R = R_z(\varphi)R_y(\vartheta)R_x(\psi) =$ $\begin{bmatrix} \cos\varphi\cos\vartheta & \cos\varphi\sin\vartheta\sin\psi - \sin\varphi\cos\psi & \cos\varphi\sin\vartheta\cos\psi + \sin\varphi\sin\psi \\ \sin\varphi\cos\vartheta & \sin\varphi\sin\vartheta\sin\psi + \cos\varphi\cos\psi & \sin\varphi\sin\vartheta\cos\psi - \cos\varphi\sin\psi \\ -\sin\vartheta & \cos\vartheta\sin\psi & \cos\vartheta\cos\psi \end{bmatrix}$, and thus, the transformation matrix $K_p$ is:

$K_p = \begin{bmatrix} R & T \\ 0 & 1 \end{bmatrix}$.

S2: controlling the three-degree-of-freedom motion platform such that the spherical head of the stylus of the force control probe is in contact with a surface of the workpiece to be measured, adjusting the movement of the X-axis sliding block to keep the spherical head of the stylus in constant force contact with the surface of the workpiece and then respectively reading X-axis, Y-axis and Z-axis displacements $x_s$, $y_s$, $z_s$ through respective grating rulers.

S3: calculating a real-time coordinate $P_t$ of the center of the spherical head of the stylus.

Specifically, in order to avoid large vibration which is generated when the stylus is in rigid contact with the workpiece surface and has an adverse effect on data acquisition, a spring is provided between the stylus and the grating, which increases the damping during the force control process so that the force control is more stable. Therefore, when the stylus is in constant force contact with the surface of the workpiece, the stylus may produce a slight displacement $\delta_s$, and at this time, the spring is compressed by the force and the displacement can be directly read by the micro grating ruler. Since the stylus is disposed in the same direction as the X-axis of the three-degree-of-freedom motion platform, the displacement $\delta_s$ is a displacement in the X-axis direction.

Therefore, the real-time coordinate $P_t$ of the center of the spherical head of the stylus can be expressed as:

$P_t(x_t, y_t, z_t) = P_0(x_0, y_0, z_0) \pm (x_s - \delta_s, y_s, z_s)$.

S4: calculating a coordinate of an actual contact point $P_w$ between the stylus and the workpiece surface in the work coordinate system.

Specifically, in order to obtain the actual contact point between the stylus and the workpiece surface, it is necessary to compensate the above-mentioned coordinate of the center of the spherical head of the stylus. In the work coordinate system, the contact direction of the stylus with the workpiece surface is the normal direction of the actual contact point $P_w$ on the workpiece surface, and the direction of the contact force received at the point $P_w$ is also the normal direction of the point $P_w$ on the workpiece surface. Thus, the direction of the contact force received at the actual contact point $P_w$ is considered to be a compensation direction of the coordinate of the center of the spherical head of the stylus.

The six-axis force sensor on the force control probe is used to capture six force signals $i_z$, when the stylus is in contact with the workpiece surface, in which $f_x$, $f_y$, $f_z$, $m_x$, $m_y$, $m_z$ respectively represent forces and moments of the force control probe in the XYZ directions of the work coordinate system. Through geometric relationships and the force analysis, a contact force $F_q(f_x', f_y', f_z')$ received at the actual contact point P is calculated, and the direction of the contact force F ($f_x'$, $f_y'$, $f_z'$) is an error compensation vector $\overset{1}{R}$ of the stylus. In order to facilitate calculation and expression, the error compensation vector $\overset{1}{R}$ of the stylus is decomposed into three components according to the geometric relationships, and the following formulas are obtained according to the force relationship:

$$\begin{cases} m_x = f'_z \cdot y_b - f'_y \cdot (L + z_b) \\ m_y = f'_x \cdot (L + z_b) + f'_z \cdot x_b \\ m_z = -f'_x \cdot y_b - f'_y \cdot x_b \\ f_x = f'_x \\ f_y = f'_y \\ f_z = f'_z \end{cases},$$

where L represents a distance from the force center $S_0$ of the six-axis force sensor to the center $Q_0$ of the spherical head of stylus.

Thus, $(x_b, y_b, z_b)$ can be expressed as a function of a force signal $M_s$, i.e., $(x_b, y_b, z_b) = f(M_s),$ and the actual contact point $P_w$ between the stylus and the workpiece surface in the work coordinate system is $P_w(x_w, y_w, z_w) = P(x_t, y_t, z_t) + (x_b, y_b, z_b)$, that is, $$\begin{bmatrix} x_w \\ y_w \\ z_w \end{bmatrix} = \begin{bmatrix} x_t \\ y_t \\ z_t \end{bmatrix} + \begin{bmatrix} x_b \\ y_b \\ z_b \end{bmatrix}.$$

S5: performing coordinate transformation of the actual contact point $P_w$ to obtain a coordinate value $(x_c, y_c, z_c)$ in the workpiece coordinate system:

$[x_c, y_c, z_c]^T = K_p [x_w, y_w, z_w]^T.$

That is, the actual contact point $P_w(x_w, y_w, z_w)$ is transformed into a corresponding point $P_c(x_c, y_c, z_c)$ in the workpiece coordinate system, and the coordinate of the point $P_c$ is expressed as $P_c(x_c, y_c, z_c) = K_p \cdot P_w(x_w, y_w, z_w)$. In this way, the three-coordinate measurement of the complex surface is completed, and the error compensation is realized during the measurement, thereby ensuring the measurement accuracy.

The above method is used to sequentially measure points on the complex surface (accurate points after compensation), and then three-dimensional reconstruction of all the point data can generate a three-dimensional model of the workpiece.

The invention also proposes an error compensation method based on force feedback information, in which the force control is realized during the measurement to make the stylus in constant force contact with the workpiece surface. The contact force between the stylus and the workpiece surface is measured, an error compensation direction is determined according to the combined force direction of the contact force, and then the effective radius of the stylus ball head is compensated in this direction. This method can effectively estimate the coordinate of the actual contact point between the stylus and the workpiece surface, and improve the measurement accuracy.

While particular embodiments of the present invention have been shown and described, it will be obvious to those skilled in the art that changes and modifications may be made without departing from the spirit and scope of the present invention.

The present invention claimed is:

1. A force control probe for three-coordinate measurement of a complex surface, comprising: a flange, a six-axis force sensor and a micro grating ruler, wherein the flange is mounted on a three-degree-of-freedom motion platform, one end of the six-axis force sensor is mounted on the flange, the other end of the six-axis force sensor is connected to a bracket on which the micro grating ruler is mounted, the micro grating ruler includes a grating and a reading head, the grating is fixed on the bracket, the reading head is mounted on the grating and is slidable within the grating, a spring is disposed between the reading head and the grating, a stylus having a spherical head is provided on the reading head, and the spherical head of the stylus is kept in constant force contact with a surface of a workpiece to be measured during measurement.

2. The force control probe of claim 1, wherein the spherical head of the stylus is kept in constant force contact with the surface of the workpiece to be measured during measurement in the following manner: an actual contact force is calculated according to a measurement result of the six-axis force sensor, the actual contact force is compared with a target contact force, when the actual contact force is greater than the target contact force, the force control probe is moved backward to enable the stylus to be away from the workpiece to be measured, and when the actual contact force is less than the target contact force, the force control probe is moved forward to enable the stylus to get close to the workpiece to be measured, so that the actual contact force is consistent with the target contact force and the spherical head of the stylus is kept in constant force contact with the surface of the workpiece to be measured.

3. A complex surface three-coordinate measuring device, comprising a three-degree-of-freedom motion platform and the force control probe of claim 1, wherein the three-degree-of-freedom motion platform is configured to move the force control probe in the three-dimensional space relative to the workpiece surface and includes a workbench as well as an X-axis motion module, a Y-axis motion module and a Z-axis motion module which are disposed on the workbench and mutually orthogonal; the X-axis motion module comprises an X-axis linear module, an X-axis servo motor, X-axis guide rails and an X-axis sliding block disposed on the X-axis linear module, in which the X-axis servo motor is configured to drive the X-axis sliding block to move in the X-axis direction, and the X-axis guide rails are respectively disposed on two sides of the X-axis sliding block to guide the movement; the Y-axis motion module comprises a Y-axis linear module, a Y-axis servo motor, Y-axis guide rails and a Y-axis sliding block disposed on the Y-axis linear module, in which the Y-axis servo motor is configured to drive the Y-axis sliding block to move in the Y-axis direction, and the Y-axis guide rails are respectively disposed on two sides of the Y-axis sliding block to guide the movement; the Z-axis motion module comprises a stand column, a Z-axis linear module, a Z-axis servo motor and a Z-axis sliding block disposed on the Z-axis linear module, in which the stand column is fixedly mounted on the workbench, the Z-axis linear module is mounted on the stand column, the Z-axis servo motor is configured to drive the Z-axis sliding block to move in the Z-axis direction, and the force control probe is fixedly mounted on the Z-axis sliding block and is in the same direction as the X-axis direction; and the X-axis linear module, the Y-axis linear module and the Z-axis linear module are respectively provided with a grating ruler, and the grating rulers are configured to respectively measure X-axis, Y-axis and Z-axis displacements when the force control probe is in constant force contact with the surface of the workpiece to be measured.

4. An error compensation method based on force feedback information for the complex surface three-coordinate measuring device according to claim 3, comprising:
S1: determining a transformation matrix $K_p$ of a work coordinate system $O_w$ to a workpiece coordinate system $O_c$ and obtaining an initial value $P_0$ ($x_0$, $y_0$, $z_0$) of the center of the spherical head of the stylus in the work coordinate system;
S2: controlling the three-degree-of-freedom motion platform such that the spherical head of the stylus of the force control probe is in contact with the surface of the workpiece to be measured, adjusting the movement of the X-axis sliding block to keep the spherical head of the stylus in constant force contact with the surface of the workpiece and then respectively reading X-axis, Y-axis and Z-axis displacements $x_s$, $y_s$, $z_s$ through respective grating rulers;
S3: calculating a real-time coordinate $P_t$ of the center of the spherical head of the stylus:

$$P_t(x_t,y_t,z_t)=P_0(x_0,y_0,z_0)+(x_s-\delta_s,z_s),$$

where $\delta_s$ represents a displacement of the stylus relative to the grating of the force control probe in the X-axis direction;
S4: calculating a coordinate of an actual contact point $P_w$ between the stylus and the workpiece surface in the work coordinate system:

$$P_w(x_w,y_w,z_w)=P_t(x_t,y_t,z_t)\pm(x_b,y_b,z_b),$$

where $x_b$, $y_b$, $z_b$ represent three components of an error compensation vector $\vec{R}$;
S5: performing coordinate transformation of the actual contact point $P_w$ to obtain a coordinate value of the actual contact point $P_w$ in the workpiece coordinate system:

$$[x_c,y_c,z_c]^T=K_p[x_w,y_w,z_w]^T.$$

5. The error compensation method based on force feedback information for the complex surface three-coordinate measuring device of claim 4, wherein the three components ($x_b$, $y_b$, $z_b$) of the error compensation vector $\vec{R}$ are calculated by the following formulas:

$$\begin{cases} m_x = f'_z \cdot y_b - f'_y \cdot (L+z_b) \\ m_y = f'_x \cdot (L+z_b) + f'_z \cdot x_b \\ m_z = -f'_x \cdot y_b - f'_y \cdot x_b \\ f_x = f'_x \\ f_y = f'_y \\ f_z = f'_z \end{cases},$$

where L represents a distance from the force center $S_0$ of the six-axis force sensor to the center $Q_0$ of the spherical head of stylus, $f_x$, $f_y$, $f_z$, $m_x$, $m_y$, $m_z$ represent six force signals obtained by the six-axis force sensor when the stylus is in contact with the workpiece surface, and $f'_x$, $f'_y$, $f'_z$ represent component forces of the contact force $F_q$ received at the actual contact point $P_w$, respectively.

6. The error compensation method based on force feedback information for the complex surface three-coordinate measuring device of claim 4, wherein the position transformation matrix $K_p$ of the work coordinate system $O_w$ to the workpiece coordinate system $O_c$ is determined by the following formulas:

$$K_p = \begin{bmatrix} R & T \\ 0 & 1 \end{bmatrix}$$

where R represents a rotation matrix from the work coordinate system to the workpiece coordinate system, and T represents a translation matrix from the work coordinate system to the workpiece coordinate system.

7. The error compensation method based on force feedback information for the complex surface three-coordinate measuring device of claim 6, wherein the translation matrix T from the work coordinate system to the workpiece coordinate system is represented as T=[$\Delta x$, $\Delta y$, $\Delta z$]$^T$, where $\Delta x$, $\Delta y$, $\Delta z$ respectively represent X-axis, Y-axis and Z-axis displacements of the center of the spherical head of the stylus in the work coordinate system to the origin in the workpiece coordinate system.

8. The error compensation method based on force feedback information for the complex surface three-coordinate measuring device of claim 6, wherein the rotation matrix R from the work coordinate system to the workpiece coordinate system is determined by the following formulas:

$$R = \begin{bmatrix} \cos\varphi\cos\vartheta & \cos\varphi\sin\vartheta\sin\psi - \sin\varphi\cos\psi & \cos\varphi\sin\vartheta\cos\psi + \sin\varphi\sin\psi \\ \sin\varphi\cos\vartheta & \sin\varphi\sin\vartheta\sin\psi + \cos\varphi\cos\psi & \sin\varphi\sin\vartheta\cos\psi - \cos\varphi\sin\psi \\ -\sin\vartheta & \cos\vartheta\sin\psi & \cos\vartheta\cos\psi \end{bmatrix}$$

where $\psi$, $\vartheta$, $\varphi$ respectively represent rotation angles of the respective XYZ axes of the workpiece coordinate system relative to the respective XYZ axes of the work coordinate system.

* * * * *